March 29, 1966  J. W. COLGAN  3,242,731
FUEL SENSING DEVICE
Filed Aug. 9, 1963
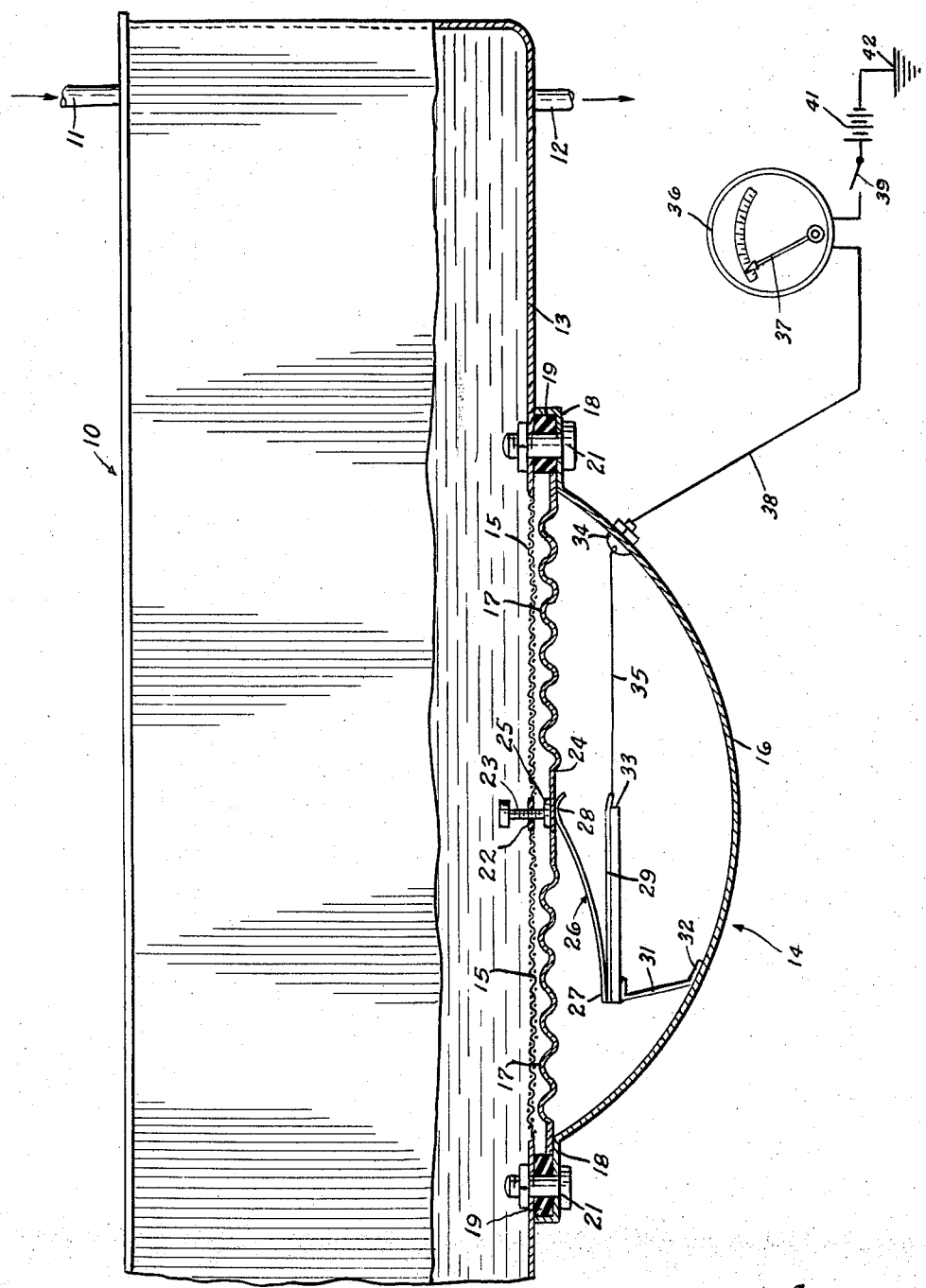
Inventor:
James W. Colgan
By Wilson & Depper
Attorneys

United States Patent Office 3,242,731
Patented Mar. 29, 1966

3,242,731
FUEL SENSING DEVICE
James W. Colgan, 1423 School St., Chicago, Ill.
Filed Aug. 9, 1963, Ser. No. 301,127
3 Claims. (Cl. 73—301)

The present invention relates to a novel fuel sensing device and more particularly to a fluid volume indicator attached to a fuel tank and electrically connected to a remotely located fuel gauge for an automobile which indicates the amount of fuel supply carried in the tank by the hydrostatic pressure exerted by the confined liquid.

Automobiles presently in use rely upon a float type gauge or measuring device in the fuel storage tank which is connected by a suitable linkage to electrical contacts in a circuit connected to an indicating gauge mounted on the dashboard of the vehicle for indicating the fuel supply. Such electrical systems utilize bimetallic strips which are heated by heating coils energized through the ignition system in the vehicle. As a float is utilized in the fuel storage and supply tank, dead spots are present at the top and bottom of the tank where the float having reached its maximum or minimum position cannot move but the fuel level can vary either to completely fill or further empty the tank. The present invention utilizes a pressure actuation system which remedies the inherent inaccuracies of the fluid level float system.

An important object of the present invention is the provision of a fuel sensing device having an electrical control circuit which is actuated by the hydrostatic pressure exerted by the fuel in a confined space and which indicates at a remote location the amount of fuel in the space. The electrical control varies the current flow through the circuit as the pressure varies due to any change in the amount of confined fuel.

Another important object of the present invention is the provision of a pressure measuring system secured to the bottom of a fuel tank having a flexible diaphragm which is exposed to the fuel within the tank. As the diaphragm is deflected or distorted from its initial position, it will provide for variation in the electrical control circuit associated therewith which in turn will vary the showing on the remotely positioned indicator.

The present invention further comprehends the provision of an electrical control circuit having a variable resistor mounted below the flexible diaphragm and a leaf spring of conductive material secured or connected at one end to one end of the variable resistor and the opposite end of the leaf spring contacts or is biased against the underside of the diaphragm so that movement of the diaphragm will cause movement of the leaf spring which will increase or decrease the length of contact between the spring and the variable resistor to vary the resistance in the circuit. Variation of the resistance will in turn vary the current flow through the system to control the indicator gauge on the dash.

The present invention also comprehends the provision of a fuel sensing system which positively varies between the maximum and minimum amounts of fuel for the supply tank without dead spots so that the gauge may be accurately calibrated in gallons instead of the full, empty and fractional markings presently in use.

Further objects are to provide a construction of maximum simplicity, efficiency, economy and ease of assembly and operation, and such further objects, advantages and capabilities as will later more fully appear and are inherently possessed thereby.

The single figure of the drawing discloses in vertical cross section a fuel supply tank with the novel fuel sensing device secured thereto and connected to a remote indicating gauge adapted to be mounted on the dashboard of an automobile, truck, etc.

Referring more particularly to the drawing in which is shown an illustrative embodiment of the present invention, a fuel storage and supply tank 10 for an automobile or other motor vehicle has an inlet 11 and an outlet 12 leading to the conventional carburetor of the automobile engine. Secured to the bottom 13 of the fuel tank in a generally central location is a fuel sensing device 14 which communicates with the tank through a screen 15 or other suitable opening in the tank bottom so as to be subject to the fluid pressure exerted by the fuel stored in the tank.

The fuel sensing device 14 includes a generally concave or downwardly dished shell 16 of sufficient strength to resist the maximum fluid pressure which may be exerted from the fuel in the tank. A flexible, generally corrugated diaphragm 17, also preferably of a metallic material, is secured to the outwardly extending peripheral flange 18 on the shell 16 by soldering, welding or other suitable means. An annular resilient sealing gasket 19 is positioned between the flange 18 and the bottom 13 of the tank, and the shell is sealingly secured to the tank by suitable securing means such as the mounting screws 21 to completely cover the opening in the tank.

The screen 15 as disclosed in the drawing has a central member 22 to receive and allow relative movement therein of an adjustment screw 23. The diaphragm 17 is provided with a central flat area 24 having a hollow bushing or block 25 mounted thereon or secured thereto. The screw 23 engages and extends into the bushing 25 to provide for adjusting the zero calibration of the diaphragm relative to the screen 15.

A leaf spring 26 is secured at one end 27 to one end of a variable resistor 29 and the opposite end 28 of the spring extends generally upward and is biased into contact with the underside of the flexible diaphragm opposite the screw 23. Adjustment of the diaphragm 17 in turn provides adjustment of the leaf spring 26 relative to the variable resistor 29. Adjustment of the amount of contact between the leaf spring 26 and the variable resistor provides for zero calibration of the remote indicator. The resistor is securely mounted at the one end secured to the leaf spring 26 onto one end of a support bracket 31 with the opposite end of the bracket being secured or affixed to the shell as at 32 by suitable means such as welding.

The bracket 31 is grounded onto the shell 16 and the end 33 of the variable resistor 29 is connected to an insulated terminal screw 34 through a wire 35. The terminal screw 34 is also connected to a remote indicator gauge 36 via a wire 38. The gauge is also connected to the ignition switch 39 and the storage battery 41 of the automobile; the storage battery having its opposite terminal grounded on the vehicle frame as at 42.

When the ignition switch 39 is closed, current flows through the indicator or gauge 36 so as to actuate the indicator pointer 37 in a manner known in the art, and through wire 38 to terminal screw 34, through wire 35 and variable resistor 29 to the left spring 26 and to the end of the resistor which is grounded via the bracket 31. When the tank 10 is empty, the diaphragm 17 is in its relaxed position and the leaf spring 26 has minimum contact with the resistor. The indicator can be adjusted to a zero reading by the adjustment screw 23 which adjusts the length of contact of the leaf spring 26 with the variable resistor 29.

As fuel is added to the tank 10 through the inlet 11, the hydrostatic pressure exerted by the liquid on the diaphragm 17 urges the diaphragm downward, and the diaphragm in turn forces the leaf spring 26 against the variable resistor 29 to increase the length of contact between the leaf spring and the resistor. As the leaf spring 26 is forced along the length of the variable resistor, the resistance in the circuit is decreased and thus the current flow in the circuit is increased and the actuating mechanism in the indicator gauge causes movement of the indicator pointer 37 to show the amount of fuel in the tank. In view of the direct relationship between the amount of fuel and the current flow without any dead spots at the top and bottom of the tank, the indicator gauge 36 may be calibrated in gallons rather than the markings presently utilized which designate full, empty and fractional designations between these two readings.

As the fuel used by the automobile is being drawn through the outlet 12, the force exerted on the diaphragm 17 is lessened and the diaphragm travels back toward its relaxed position. The leaf spring 26 also moves upward to gradually decrease the length of contact between the leaf spring and the variable resistor 29 so that the resistance in the circuit increases and results in a decrease in the current flow.

Although the adjusting screw 23 is shown in the drawing as located at the diaphragm 17 to adjust the position of the leaf spring 26 relative to the variable resistor 29, it is not necessary to have the screw so positioned. The screw may be located on the bottom of the shell 16 and connected to the lower end of the mounting bracket 31 to adjust the relative vertical position of the mounting bracket and the variable resistor 29 with respect to the diaphragm 17 and leaf spring 26. Further, in the event a close tolerance can be held, the adjusting screw may be eliminated.

While the improvement has been shown and described as being advantageously applicable to the fuel tank for an automobile, it is not my desire or intent to unnecessarily limit the scope or the utility of the improved features by virtue of this illustrative embodiment.

Having thus disclosed the invention, I claim:

1. A fuel sensing device communicating with a fuel storage and supply tank for indication of the fuel content in the tank at a remote location, comprising a concave shell sealingly secured to the bottom of a fuel tank having an opening covered thereby, a flexible diaphragm secured at its periphery to the periphery of the shell and exposed to the fuel in the tank through the opening, a variable resistor rigidly mounted within and grounded to the shell below said diaphragm, a curved metal leaf spring having one end secured to one end of the resistor, said spring curving upwardly away from the resistor with the free end contacting the diaphragm, an indicator gauge remote from the shell electrically connected to the opposite end of the resistor, and a power source communicating with the gauge such that the gauge is responsive to current flow through the resistor.

2. A fuel sensing device as set forth in claim 1, in which flexure of said diaphragm downwardly by increasing fuel content of the tank causes the leaf spring to contact the resistor along a greater length of the spring and thus decrease the resistance in the circuit.

3. A fuel sensing device as set forth in claim 1, including an adjusting screw mounted in said tank to contact the diaphragm and adjust the position of the diaphragm and the leaf spring to vary the initial contact of the leaf spring on the resistor.

References Cited by the Examiner

UNITED STATES PATENTS

| | | | |
|---|---|---|---|
| 1,171,480 | 2/1916 | Troll | 73—301 |
| 1,255,034 | 1/1918 | Mason | 73—301 |
| 1,518,435 | 12/1924 | Knobloch | 73—299 |
| 1,856,899 | 5/1932 | Zeller | 73—301 X |
| 2,066,700 | 1/1937 | Slough | 73—301 X |
| 2,548,960 | 4/1951 | Ekstrom | 73—301 |
| 3,030,598 | 4/1962 | Cerny et al. | 73—398 X |
| 3,080,757 | 3/1963 | Johansson | 73—398 |

LOUIS R. PRINCE, *Primary Examiner.*

FRANK H. THOMSON, *Assistant Examiner.*